United States Patent
Milluzzi et al.

(10) Patent No.: US 12,553,735 B2
(45) Date of Patent: Feb. 17, 2026

(54) SELECTIVE THREE-DIMENSIONAL LOCALIZATION AND NAVIGATION SYSTEMS AND METHODS

(71) Applicant: DISNEY ENTERPRISES, INC., Burbank, CA (US)

(72) Inventors: Andrew Jesse Milluzzi, Clermont, FL (US); Kevin T. Parent, Florence, MA (US); Bryant D. Boyle, Montverde, FL (US); Bradley A. Pease, South El Monte, CA (US); Allan Bloemsma, Glendale, CA (US); Selina L. Herman, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 83 days.

(21) Appl. No.: 18/418,617

(22) Filed: Jan. 22, 2024

(65) Prior Publication Data
US 2025/0237519 A1     Jul. 24, 2025

(51) Int. Cl.
*G01C 21/36*     (2006.01)
*G06T 17/05*     (2011.01)

(52) U.S. Cl.
CPC .......... *G01C 21/3638* (2013.01); *G06T 17/05* (2013.01)

(58) Field of Classification Search
CPC ....... G01C 21/3638; G06T 17/05; G06T 7/50; G06T 7/70
See application file for complete search history.

(56) References Cited

U.S. PATENT DOCUMENTS

| 9,193,355 B2 | 11/2015 | Ferguson et al. |
| 9,911,340 B2 | 3/2018 | Samarasekera et al. |
| 11,269,063 B1 | 3/2022 | Bendickson et al. |

(Continued)

FOREIGN PATENT DOCUMENTS

| CN | 114281832 A | * | 4/2022 |
| CN | 111599001 B | | 3/2023 |

(Continued)

OTHER PUBLICATIONS

Rozsa et. al., "Obstacle Prediction for Automated Guided Vehicles Based on Point Clouds Measured by a Tilted LIDAR Sensor", IEEE Transactions on Intelligent Transportation Systems, 2018, 13 pages.

(Continued)

*Primary Examiner* — Helal A Algahaim
(74) *Attorney, Agent, or Firm* — Dorsey & Whitney LLP

(57) ABSTRACT

A method may include receiving a 3D point cloud of a space, identifying points of the 3D point cloud at selective locations of the 3D point cloud, and comparing the points to a map of the space to localize an AGV within the space. A method may include receiving a 3D point cloud of a space, identifying multiple points of the 3D point cloud at respective beam angles from a sensor, and comparing the multiple points to a map of the space to localize an AGV within the space. A method may include receiving a 3D point cloud of a space, identifying first and second sets of points at respective first and second 2D planes, and comparing the sets of points to a map of the space to localize an AGV within the space. Additional methods and associated systems are also disclosed.

25 Claims, 6 Drawing Sheets

(56) References Cited

U.S. PATENT DOCUMENTS

| | | | |
|---|---|---|---|
| 11,592,820 | B2 | 2/2023 | Owechko |
| 2021/0055420 | A1 | 2/2021 | Wohlfeld et al. |
| 2022/0092291 | A1 | 3/2022 | Lai et al. |
| 2022/0092802 | A1 | 3/2022 | Jang et al. |
| 2022/0107391 | A1 | 4/2022 | Ren et al. |

FOREIGN PATENT DOCUMENTS

| | | | | | |
|---|---|---|---|---|---|
| CN | 115775242 | A | | 3/2023 | |
| CN | 110796728 | B | | 5/2023 | |
| CN | 114812435 | B | * | 10/2023 | ......... G01B 11/2433 |
| EP | 3846134 | A1 | * | 7/2021 | ............... G06T 3/40 |
| JP | 6899370 | B2 | | 6/2021 | |
| JP | 7402756 | B2 | * | 12/2023 | |
| KR | 101678124 | B1 | | 11/2016 | |
| KR | 20220081776 | A | * | 6/2022 | ......... G01C 21/3848 |
| KR | 20230047759 | A | | 4/2023 | |
| WO | WO-2022268375 | A1 | * | 12/2022 | ............. G06V 20/58 |

OTHER PUBLICATIONS

Bi et al., "A Survey of Low-Cost 3D Laser Scanning Technology", Appl. Sci. 2021, 11, 3938, https://www.mdpi.com/2076-3417/11/9/3938, 39 pages.

Teng et al., "CloudNavi: Towards Ubiquitous Indoor Navigation Service with 3D Point Clouds", http://www.greenorbs.org/people/liu/guodeke/CloudNavi.pdf, 2016, 14 pages.

Wen et al., "GNSS NLOS Exclusion Based on Dynamic Object Detection Using LiDAR Point Cloud", IEE Transactions on Intelligent Transportation Systems, https://ieeexplore.ieee.org/abstract/document/8946873, 2019, 10 pages.

* cited by examiner

SELECTIVE THREE-DIMENSIONAL LOCALIZATION AND NAVIGATION SYSTEMS AND METHODS

FIELD

The present application relates generally to selective three-dimensional (3D) localization and navigation, and more specifically, for example, to selective 3D point cloud localization and navigation.

BACKGROUND

When an Automated Guided Vehicle (AGV) is operating in a confined space and localizes from visible landmarks, other vehicles or objects in the space can occlude the AGV's ability to see such landmarks. This is especially true when a fleet of AGVs is operating in the same space, where the number of AGVs introduce multiple occlusions for a single AGV. Landmarks are typically contained on a two-dimensional (2D) plane, level with a scanning sensor, making occlusion easy. 2D scanning is typically utilized due to sensor availability and system complexity. Even vehicles equipped with three-dimensional (3D) scanners still tend to use a single 2D plane to localize and navigate due to computational complexity.

Regarding 3D scanning specifically, previous solutions would either try to match the entire 3D point cloud or match to a single 2D plane. Trying to match to an entire 3D point cloud has high computational overhead. Matching to a single 2D plane or level, or matching to only specific beacons or anchoring elements, suffers from occlusion issues, as noted above.

BRIEF SUMMARY

According to various embodiments, a method includes receiving a 3D point cloud of a space, and identifying a point set of the 3D point cloud at selective locations of the 3D point cloud. In embodiments, the method includes comparing the point set to a map of the space to localize an AGV within the space.

Optionally, the selective locations include multiple beam angles from a reference point. In embodiments, the identifying comprises identifying first, second, and third points of the 3D point cloud at respective first, second, and third beam angles from a reference point. In embodiments, the method includes identifying a fourth point of the 3D point cloud at a fourth beam angle from the reference point. In embodiments, the identifying the fourth point is based on an occlusion to one of the first point, the second point, or the third point. In embodiments, the identifying the fourth point provides additional data for improved accuracy or performance. In embodiments, the method includes comparing the fourth point and at least two of the first, second, and third points to the map to localize the AGV within the space.

Optionally, the selective locations include multiple 2D planes of the 3D point cloud. In embodiments, the identifying includes identifying a first set of points at a first 2D plane of the 3D point cloud. In embodiments, the identifying includes identifying a second set of points at a second 2D plane of the 3D point cloud. In embodiments, the method includes switching between the first set of points and the second set of points when comparing to the map. In embodiments, the switching is based on an occlusion from a sensor to the one of the first 2D plane or the second 2D plane. In embodiments, the switching provides additional data for improved accuracy or performance.

Optionally, the map is a 3D map of the space.

Optionally, a system is configured to perform any of the above methods. In embodiments, the system includes one or more sensors configured to perform a 3D scan of the space to generate the 3D point cloud.

Optionally, an AGV includes a processor configured to perform any of the above methods. In embodiments, the AGV is a ride vehicle operating in a thematic environment. In embodiments, the processor is local to the AGV or on a wayside.

According to various embodiments, a method includes receiving a 3D point cloud of a space, and identifying first, second, and third points of the 3D point cloud at respective first, second, and third beam angles from a sensor. In embodiments, the method includes comparing the first, second, and third points to a map of the space to localize an AGV within the space.

Optionally, the method includes identifying a fourth point of the 3D point cloud at a fourth beam angle from the sensor. In embodiments, the method includes comparing the fourth point and at least two of the first, second, and third points to the map to localize the AGV within the space. In embodiments, the identifying the fourth point is based on an occlusion to one of the first, second, or third point. In embodiments, the identifying the fourth point provides additional data for improved accuracy or performance.

Optionally, the first, second, and third beam angles are fixed angles in 3D space from the sensor. In embodiments, the first, second, and third beam angles are selected to identify an anchoring element within the space.

Optionally, the first, second, and third points are at multiple levels within the space.

According to various embodiments, a method includes receiving a 3D point cloud of a space, and identifying a first set of points at a first 2D plane of the 3D point cloud. In embodiments, the method includes identifying a second set of points at a second 2D plane of the 3D point cloud. In embodiments, the method includes comparing the first set of points and the second set of points to a map of the space to localize an AGV within the space.

Optionally, the method includes switching between the first set of points and the second set of points when comparing to the map. In embodiments, the switching is based on insufficient data at one of the first 2D plane or the second 2D plane. In embodiments, the switching is based on an occlusion from a sensor to the one of the first 2D plane or the second 2D plane.

Optionally, at least one of the first 2D plane or the second 2D plane is adjacent a wall, floor, or ceiling of the space.

Optionally, at least one of the first 2D plane or the second 2D plane is a horizontal plane.

Optionally, localizing the AGV within the space includes identifying an anchoring element or feature in the map based on Cartesian locating or pole location.

According to various embodiments, a method for controlling an AGV within a ride environment includes capturing environmental data via a 3D sensor. In embodiments, the method includes filtering the environmental data based on a 2D localization. In embodiments, the method includes comparing the 2D localization to known environmental information to determine a localization of the AGV.

Optionally, the capturing includes capturing a 3D point cloud of the ride environment. In embodiments, the filtering includes identifying a set of points at a 2D plane of the 3D point cloud. In embodiments, the filtering includes identifying first, second, and third points of the 3D point cloud at respective first, second, and third beam angles from the 3D sensor.

Optionally, the known environmental information comprises a map of the ride environment.

DETAILED DESCRIPTION

Figure 1:
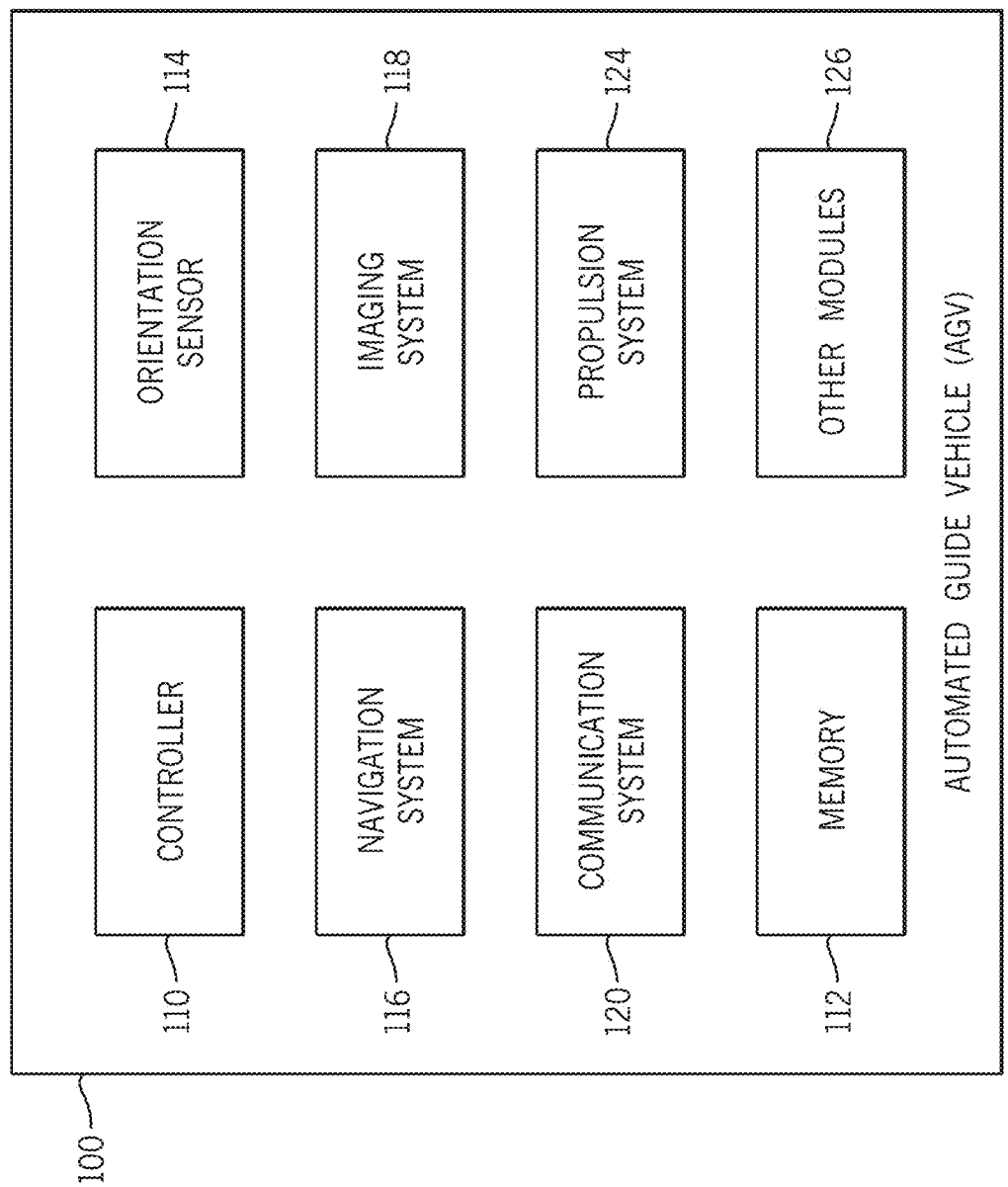
FIG. 1 illustrates a block diagram of an AGV.

According to various embodiments, the present disclosure leverages multiple beams in a scan to match to an existing (e.g., 3D) map. For example, embodiments of the present disclosure provide a robust way to triangulate position based off of key or select beam angles. Such examples simplify the points that need to match in order to localize, which may also result in faster processing (e.g., less computational and/or communication overhead) compared to matching an entire point cloud. Additionally, or alternatively, by using 3D space, such solutions avoid the occlusion issue for 2D maps and/or ensure the ability to detect anchoring element or feature in the space. For instance, the effects of occlusions can be limited, and confidence/accuracy can increase, as multiple beam azimuths can be utilized to localize and navigate. A multi-beam approach uses a number of radial beams in 3D space (e.g., X, Y, and Z angles from a reference point in space, such as a sensor, from the AGV, etc.) for comparison against a known map of the space. When a number of these points validly intersect the existing map in a way that is unique, a relative polar location of the reference point to each of the points is determined, which can then be converted into a pose (location and orientation) for the AGV. More beams may be required for greater confidence (e.g., uniqueness in the intersection of the map).

In some embodiments, the present disclosure leverages the use of multiple 2D planes or levels in a point cloud scan to increase the number of reference landmarks (e.g., walls, key objects, etc.) in a space to mitigate the effects of occlusions. For example, embodiments of the present disclosure may simplify a full 3D point cloud but still retain multiple 2D maps for a given space to select a plane or level that may not be occluded, e.g., utilizing the best portion of a point cloud based on occlusions. A system may switch (e.g., dynamically) between different portions, such as planes or levels, such as based on occlusions, key features, and/or excessive noise. Such examples may result in faster processing (e.g., less computational overhead) compared to full point cloud analysis. Additionally, in some embodiments, all maps may be compared at once (e.g., using a Kalman filter) to provide a robust estimate of an AGV's current location. As a result, a more robust localization solution may be produced enabling better navigation decisions and accuracy of movement. Additionally, or alternatively, the systems and methods described herein may be used to allow faster processing for AGVs, such as ride vehicles within a ride or theme park environment, where the environment for the detected sensor information is generally known but may have unexpected occlusions or other sensor vision issues. A multi-level approach compares a 2D plane of points against a known map. The plane can be parallel to the ground, horizontal, or can be canted, potentially all the way to vertical (depending on the space, such that it has a unique map). When a number of these points validly interest a portion of the map, the map area is recognized and the AGV may be localized.

Both approaches may simplify the problem of searching the map. The multi-beam approach may use selective beam angles that form a solution (e.g., a single solution) with the map, such as to avoid searching the entire map. The multi-level approach may allow a system to match an area of the map and then localize the position of the AGV. Both approaches may tolerate occlusions or otherwise a bad environment (e.g. mirrors, fog, etc.) by having extra beams or allowing the system to change the 2D plane of comparison, while also reducing computational overhead.

In various embodiments, the various methods and systems described herein may be used to help control and navigate vehicles, such as those within a ride or theme park environment. By leveraging knowledge of the operating environment (e.g., the ride enclosure), the system can expedite localization processing, without the use of expensive sensors or large computational overhead. Further, the control systems can be utilized in operating environments that may be difficult to navigate within, e.g., dark, foggy, or including other thematic elements that typically may impact navigational sensors and processing.

FIG. 1 illustrates a block diagram of an AGV 100, in accordance with an embodiment of the disclosure. The AGV 100 may be a pilotless vehicle, such as a ground vehicle, a water vehicle, an aerial vehicle, or other mobile platform. In one example, the AGV 100, which may be referred to as an autonomous guided vehicle or a free ranging vehicle, may be any pilotless vehicle operating within a ride environment or attraction (e.g., a ride vehicle), without intent to limit. Depending on the application, the AGV 100 may by piloted autonomously (e.g., via an onboard controller or a centralized controller) or via remote control. The AGV 100 may be a people mover or a ride/attraction element configured to move through a defined space (e.g., a ride environment or attraction), although other configurations are contemplated. As a result, the term "AGV" is characterized by function and not by shape, type, or propulsion technology. As shown, the AGV 100 may include one or more of a controller 110, a memory 112, an orientation sensor 114, a navigation system 116, an imaging system 118, a communication system 120, a propulsion system 124, and other modules 126. While embodiments are described with respect to an AGV, the systems and methods described herein may apply to other types of vehicles and/or controls.

The controller 110, according to various embodiments, includes one or more of a processor, a microprocessor, a central processing unit (CPU), an electronic control unit, a graphics processing unit (GPU), a single-core processor, a multi-core processor, a microcontroller, a programmable logic device (PLD) (e.g., field programmable gate array (FPGA)), an application specific integrated circuit (ASIC), a digital signal processing (DSP) device, or other logic device that may be configured, by hardwiring, executing software instructions, or a combination of both, to perform various operations discussed herein for embodiments of the disclosure. The controller 110 may be configured to interface and communicate with the various other components of the AGV 100 to perform such operations. For example, the controller 110 may be configured to receive and process data received from a network and/or one or more sensors (e.g., imaging system 118), store the data in memory 112, and/or retrieve stored data from memory 112.

The controller 110 may include combinations of hardware and software processing functionality and may be provided with/in and/or communicatively attached to other components to execute appropriate instructions, such as software instructions and/or processing parameters stored in memory 112. In various embodiments, the controller 110 may be configured to execute software instructions stored in memory 112 to perform various methods, processes, or operations in the manner described herein.

The memory 112 includes, in one embodiment, one or more memory devices configured to store data and information, including magnetic flux data and position information. The memory 112 may include one or more various types of memory devices including volatile and non-volatile memory devices, such as random-access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, the controller 110 may be configured to execute software instructions stored in memory 112 to perform the various methods, processes, and operations described herein. In embodiments, the controller 110 may be configured to store data in memory 112.

The orientation sensor 114 may be implemented as one or more of a compass, float, accelerometer, and/or other device capable of measuring an orientation of AGV 100 (e.g., magnitude and direction along or relative to an axis, relative to one or more reference orientations such as gravity and/or Magnetic North, etc.), imaging system 118, and/or other elements of the AGV 100. In embodiments, the orientation sensor 114 may be implemented as one or more inertial measurement units (IMUs), electronic sextants, semiconductor devices, integrated chips, accelerometer sensors, accelerometer sensor systems, or other devices capable of measuring angular velocities/accelerations and/or linear velocities/accelerations (e.g., direction and magnitude) of AGV 100 (or portions thereof). In embodiments, the orientation sensor 114 may provide measurements as sensor signals and/or data that may be communicated to various devices of AGV 100 (e.g., controller 110, memory 112, etc.).

The navigation system 116 may include one or more components or elements capable of providing a location (e.g., in real-time or near real-time) of the AGV 100. In embodiments, the navigation system 116 may provide a map of the current location of the AGV 100, such as within or otherwise relative to an attraction. The navigation system 116 may be implemented according to any navigation standard. For example, the navigation system 116 may be implemented according to a global navigation satellite system, including a GPS, GLONASS, and/or Galileo based receiver and/or other device capable of determining absolute and/or relative position of the AGV 100 (e.g., or an element of the AGV 100) based on wireless signals received from space-born and/or terrestrial sources, for example. In some embodiments, the orientation sensor 114 may include an altimeter, for example, or may be used to provide an altitude of the AGV 100. In embodiments, the navigation system 116 may provide measurements as sensor signals and/or data (e.g., coordinates) that may be communicated to various devices of AGV 100 (e.g., controller 110, memory 112, etc.). In some embodiments, the navigation system 116 may be non-GPS-based. For example, navigation may be based on a map with known environmental features of the environment (e.g., waypoints, ride elements, etc.), and in such embodiments, the AGV 100 may navigate via identification of the known environmental features (e.g., using the imaging system 118)

The imaging system 118 may include one or more imaging devices, modules, or sensors (e.g., cameras), such as visible spectrum and/or infrared sensitive detector elements. In embodiments, the imaging system 118 may include one or more logic devices configured to process captured imagery and/or provide the imagery to controller 110. In embodiments, the imaging system 118 may be arranged on the AGV 100 and configured to perform any of the operations or methods described herein, at least in part, or in combination with controller 110. The imaging system 118 may capture a 3D representation of the space surrounding the AGV 100. For example, one or more sensors of the imaging system 118 may be configured to perform a 3D scan of a space, such as to generate a 3D point cloud. In embodiments, data from multiple 2D sensors can be assembled into a 3D representation of the space. In embodiments, the imaging system 118 may provide a complete 360-degree coverage around the AGV 100, such as through multiple systems covering separate sectors around the AGV 100, although other configurations are contemplated. In embodiments, the AGV 100 may be configured to use the imagery and/or sensor data captured by the imaging system 118 to control operation of AGV 100, such as controlling propulsion system 124 to move the AGV 100 to a desired position in space.

The communication system 120 may be implemented as any wired and/or wireless communication system configured to transmit and receive analog and/or digital signals between elements of AGV 100 and/or between the AGV 100 and an external system. For example, the communication system 120 may be configured to receive control signals and/or data from a base station or controller, and provide them to controller 110. In embodiments, the communication system 120 may be configured to receive images and/or other sensor information (e.g., visible spectrum and/or infrared still images or video images) from the imaging system 118 and relay the sensor data to the controller 110 and/or external base station/controller. Wireless communication links may include one or more analog and/or digital radio communication links, such as WiFi and others, and may be direct communication links established between elements of AGV 100, for example, or may be relayed through one or more wireless relay stations configured to receive and retransmit wireless communications. Communication links established by the communication system 120 may be configured to transmit data substantially continuously throughout operation of AGV 100, where such data includes various types of sensor data, control parameters, and/or other data, as described herein.

The propulsion system 124 may be configured to provide a motive force to propel, lift, and/or steer the AGV 100. Depending on the application, the propulsion system 124 may include various drive systems (e.g., pumps, motors, transmissions, drivetrains, etc.) operable to drive one or more wheels, propellers, and/or thrusters. In embodiments, the propulsion system 124 may be controlled (e.g., by controller 110) to provide a motion and/or an orientation for the AGV 100. In embodiments, the propulsion system 124 may be implemented with a portable power supply, such as a battery and/or a combustion engine/generator and fuel supply.

Other modules 126 may include other and/or additional sensors, actuators, communications modules/nodes, and/or user interface devices, for example, and may be used to provide additional environmental information related to operation of AGV 100, for example. In embodiments, the other modules 126 may include a radar system, a proximity sensor, and/or an environmental sensor. In embodiments, the other modules 126 may include a user interface. The user interface may display measurements and/or sensor signals and/or provide operational control of the AGV 100. In embodiments, the other modules 126 may include a safety/control system, such as a collision prevention system. In such embodiments, the safety/control system may detect and prevent collisions with objects, features, or other hazards within the environment.

Any of the features, components, and/or parts, including the arrangements and configurations thereof shown in FIG. 1 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 1.

Figure 2:
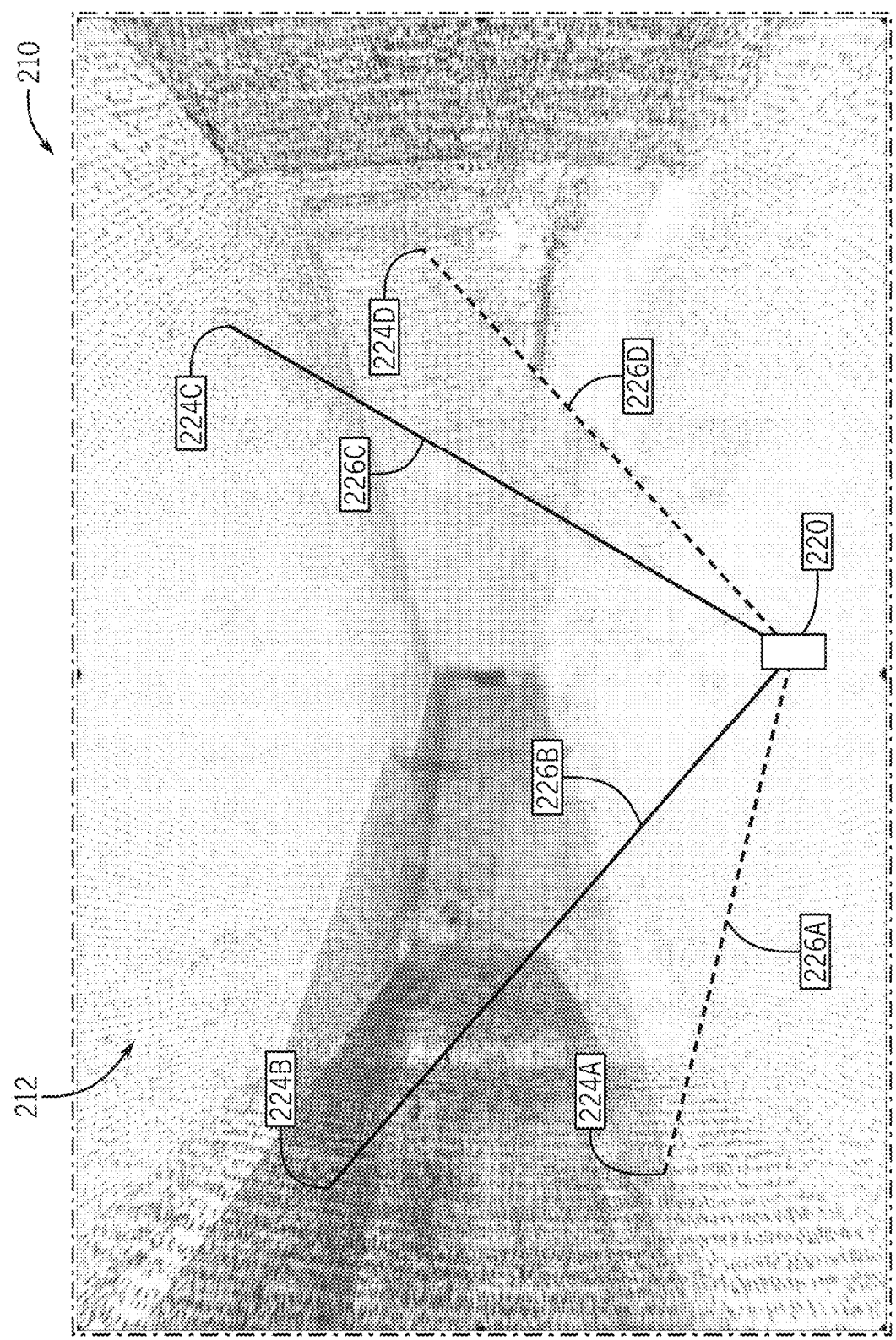
FIG. 2 illustrates an example multi-beam 3D point cloud localization and navigation.

FIG. 2 illustrates an example multi-beam 3D point cloud localization and navigation. In embodiments, environmental data may be captured via a 3D sensor. For example, referring to FIG. 2, the AGV 100, such as the imaging system 118 or another sensor, may receive or capture a 3D point cloud 210 of a space 212 in which the AGV 100 is operating (e.g., a ride environment). In embodiments, a sensor of the imaging system 118 may perform a 3D scan of the space 212 to generate the 3D point cloud 210. The 3D point cloud 210 is a discrete set of data points in space 212, each data point representing a single spatial measurement on a detected surface of the space 212 (e.g., walls, ceilings, floors, ride elements, etc.). Taken together, the 3D point cloud 210 represents the detected surfaces of the space 212.

To localize and/or navigate the AGV 100 within the space 212, the environmental data may be filtered based on a 2D localization. For example, a plurality of points of the 3D point cloud 210 may be identified at selective locations of the 3D point cloud 210. In embodiments, the selective locations may include multiple beam angles from a reference point or sensor 220. For example, as shown, a first point 224A may be identified at a first beam angle 226A, and a second point 224B may be identified at a second beam angle 226B. In embodiments, a third point 224C may be identified at a third beam angle 226C. In embodiments, a fourth point 224D may be identified at a fourth beam angle 226D. The beam angles may be at different azimuths and/or altitudes from the reference point/sensor 220. In embodiments, the beam angles may be fixed angles from the reference point/sensor 220. For example, the first beam angle 226A may be at a 30-degree angle, the second beam angle 226B may be at a 45-degree angle, and the third beam angle 226C may be at an 80-degree angle, although other configurations are contemplated. In embodiments, the points may be at multiple levels within the space 212. For example, the first point 224A may be adjacent the floor, the second point 224B may be at an upper portion of a wall, the third point 224C may be at the corner of the ceiling and wall, and the fourth point 224D may be at a midpoint between the ceiling and floor of the space 212, although other configurations are contemplated. The points may be identified based on Cartesian locating or pole location relative to the sensor 220. In embodiments, a multi-beam approach may benefit from polar coordination as the computational overhead of the trigonometric functions may be excessive. Although four points are described, additional points may be identified, such as to provide increased accuracy, performance, or confidence. The sensor 220 may be a vision sensor (e.g., a camera-style sensor) or include a spinning mirror configuration, among other configurations.

In embodiments, the 2D localization may be compared to known environmental information to determine a localization or pose (e.g., location and orientation) of the AGV 100. The known environmental information may include a map of the space 212 or ride environment. In such embodiments, the identified points of the 3D point cloud 210 may be compared to the map, such as to localize the AGV 100 within the space 212. For example, any combination of the first point 224A, the second point 224B, the third point 224C, and the fourth point 224D may be compared to match the points to the map, thereby localizing the AGV 100 within the space 212. Although four points are illustrated in FIG. 2, less than four points or greater than four points at specific azimuths/beam angles from the imaging system 118 may be used to localize the AGV 100 in space 212.

The solution illustrated in FIG. 2 may provide a robust way to triangulate or otherwise identify the position of the AGV 100 within the ride environment based off of key beam angles. For example, the solution of FIG. 2 may minimize the effects of occlusions as multiple beam azimuths can be utilized. More particularly, identifying the fourth point 224D may be based on an occlusion from the reference point/sensor 220 (imaging system 118) to one of the first point 224A, the second point 224B, or the third point 224C. For instance, an object, person, or ride element may be positioned between the reference point/sensor 220 and one of the key points of 3D point cloud 210, such that the key point(s) is occluded from view by the imaging system 118. In such embodiments, the non-occluded points of the 3D point cloud 210 may be compared to the map. For example, the fourth point 224D and at least two of the first, second, and third points 224A, 224B, 224C may be compared to the map to localize the AGV 100 within the space 212, although other configurations are contemplated. In embodiments, the system may dynamically switch between different points (e.g., based on occlusions) to identify a sufficient number of points (e.g., at least three) to localize the AGV 100. The system may also use additional points (e.g., four or more points) to improve the probability of its computed localization solution (e.g., to improve confidence in the pose of the AGV 100).

In embodiments, the points may be specific features of one or more anchoring elements within the environment. An anchoring element may be a large, key, and/or prominent element or feature of the environment, such as a show set, a structure, a ceiling, a wall-to-ceiling juncture, a wall opening, or a visual marker, among others, that is known or defined in the environment. For example, the anchoring element may be distinct and/or well understood by the system in terms of its location, views, and potential for occlusions. In such embodiments, the anchoring element may be identified and compared to the map to localize the AGV 100 within the environment. In embodiments, the beam angles may be selected to identify the anchoring element within the space 212.

In this manner, the AGV 100 may be localized within the space 212 with a high level of confidence, even when one or multiple occlusions are present. By looking at selective points of the 3D point cloud 210, less computational overhead may also be realized compared to matching the entire or a substantial portion of the point cloud. For example, by using multiple specific beams in a scan to match to a 3D map, the points need to match may be may be simplified to localize compared to conventional approaches with high computational overhead. In some embodiments, the point cloud localization may be combined with other localization features. For example, an optical feature (e.g., retro reflectors, etc.) may be further identified as a redundant feature in the environment to localize the AGV 100 within the space 212 or ride environment.

After determining the position of the AGV 100 within the space 212, a control operation for the AGV 100 may be determined. For example, one or more navigation controls may be determined, such as in connection with a ride attraction. In such embodiments, the navigation controls may be processed to navigate the AGV 100 within the space 212. For example, the navigation controls may be processed by the controller 110 to navigate the AGV 100 using propulsion system 124. In various embodiments, the AGV 100 processing for localization can be faster and more efficient, without requiring expensive location sensors or processing power that is typically required for autonomous vehicles.

Any of the features, components, and/or parts, including the arrangements and configurations thereof shown in FIG. 2 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 2.

Figure 3:
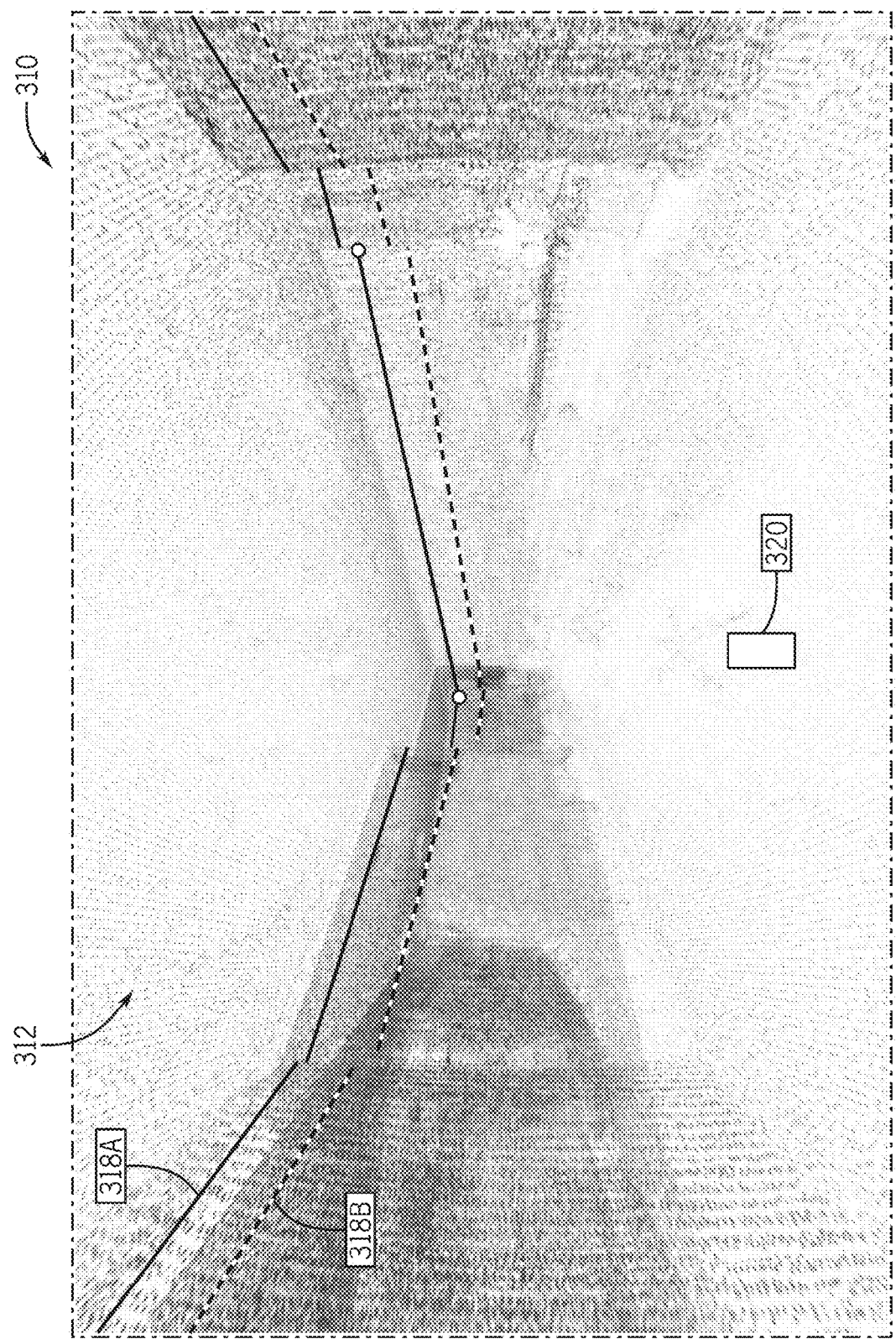
FIG. 3 illustrates an example multi-level 3D point cloud localization and navigation.

FIG. 3 illustrates an example multi-level 3D point cloud localization and navigation. Except as otherwise noted below, the system illustrated in FIG. 3 may be similar to the system illustrated in FIG. 2. For example, environmental data may be captured via a 3D sensor (e.g., of imaging system 118). Referring to FIG. 3, the AGV 100, such as the imaging system 118 or another sensor, may receive or capture a 3D point cloud 310 of a space 312 in which the AGV 100 is operating (e.g., a ride environment). In embodiments, a sensor of the imaging system 118 may perform a 3D scan of the space 312 to generate the 3D point cloud 310.

To localize and/or navigate the AGV 100 within the space 312, the environmental data may be filtered based on a 2D localization. For example, a plurality of points of the 3D point cloud 310 may be identified at selective locations of the 3D point cloud 310. In embodiments, the selective locations may include multiple 2D planes of the 3D point cloud 310. For example, as shown, a first set of points at a first 2D plane 318A of the 3D point cloud 310 may be identified, and a second set of points at a second 2D plane 318B of the 3D point cloud 310 may be identified. In embodiments, additional 2D planes of the 3D point cloud 310 may be identified, such as a third 2D plane at a third level of the 3D point cloud 310, a fourth 2D plane at a fourth level of the 3D point cloud 310, and so on. As shown, the first 2D plane 318A and/or the second 2D plane 318B may be a horizontal plane within the space 312. For example, the first 2D plane 318A and/or the second 2D plane 318B may extend parallel or substantially parallel to the floor and/or ceiling. The points may be identified based on Cartesian locating or pole location relative to a sensor 320. The sensor 320 may be a vision sensor (e.g., a camera-style sensor) or include a spinning mirror configuration, among other configurations.

The 2D planes may be at different levels or altitudes within the 3D point cloud 310. For example, the first 2D plane 318A may be at a first level of the 3D point cloud 310, and the second 2D plane 318B may be at a second level of the 3D point cloud 310. In embodiments, the first 2D plane 318A may be at or adjacent a wall, floor, or ceiling of the space, and the second 2D plane 318B may be spaced (e.g., below, above, or spaced laterally from) the first 2D plane 318A, although other configurations are contemplated. The various levels may be at or close to the ceiling or ground to avoid occlusions that are typically present at sensor level.

In embodiments, the 2D localization may be compared to known environmental information to determine a control operation for the AGV 100. Like FIG. 2, the known environmental information may include a map of the space 312 or ride environment. In such embodiments, the identified points of the 3D point cloud 310 may be compared to the map, such as to localize the AGV 100 within the space 312. For example, the first set of points and/or the second set of points may be compared to match the points to the map, thereby localizing the AGV 100 within the space 312. Although two sets of points at two levels of the 3D point cloud 310 are illustrated in FIG. 3, less than 2 sets of points or greater than two sets of points may be used to localize the AGV 100 in space.

In embodiments, the system may switch between the first set of points and the second set of points when comparing to the map. In embodiments, the switching between the different levels may be based on insufficient data at one of the first 2D plane 318A or the second 2D plane 318B, such as based on an occlusion from the sensor 320 to the one of the first 2D plane 318A of the second 2D plane 318B. Additionally, or alternatively, the switching between the different levels may be based on detection of unmapped/unrecognized objects or features in the space. For instance, an object, person, ride vehicle, or ride element may be positioned between the sensor 320 and one set of points, such that the key points are occluded from view by the imaging system 118. In such embodiments, the non-occluded points of the 3D point cloud 310 may be compared to the map. For example, the second set of points may be compared to the map when the first set of points are occluded, and vice versa. In embodiments, the system may dynamically switch between the different levels based on detected occlusions and/or to improve localization confidence and/or improve resolution. In embodiments, the switching between the different levels may be based on other factors, including show elements (e.g., mirrors, fog, etc.), excessive noise, key features, or other characteristics.

The solution illustrated in FIG. 3 may be another robust way to localize the position of the AGV 100 within the ride environment. For example, the solution of FIG. 3 may minimize the effects of occlusions and increase confidence and/or improve resolution as multiple levels can be utilized. In this manner, the AGV 100 may be localized within the space 312 with a high level of confidence, even when one or multiple occlusions are present. By looking at selective points of the 3D point cloud 310, less computational overhead may also be realized compared to matching the entire or a substantial portion of the point cloud. In some embodiments, the point cloud localization may be combined with other localization features. For example, an optical feature (e.g., retro reflectors, etc.) may be encoded in the levels to aid in navigation.

The solution illustrated in FIG. 3 may simplify a full 3D point cloud but still retain multiple 2D maps for a given space to select a level that may not be occluded. Such embodiments may result in faster processing compared to a full point cloud but still proved a more robust solution compared to a single 3D map. In addition, all maps may be compared at once (e.g., via a Kalman filter) to provide a robust localization solution of the AGV 100 within the space 312.

After determining the position of the AGV 100 within the space 312, a control operation for the AGV 100 may be determined. For example, one or more navigation controls may be determined, such as in connection with a ride attraction. In such embodiments, the navigation controls may be processed (e.g., by the processor) to navigate the AGV 100 within the space 312.

Any of the features, components, and/or parts, including the arrangements and configurations thereof shown in FIG. 3 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 3.

Figure 4:
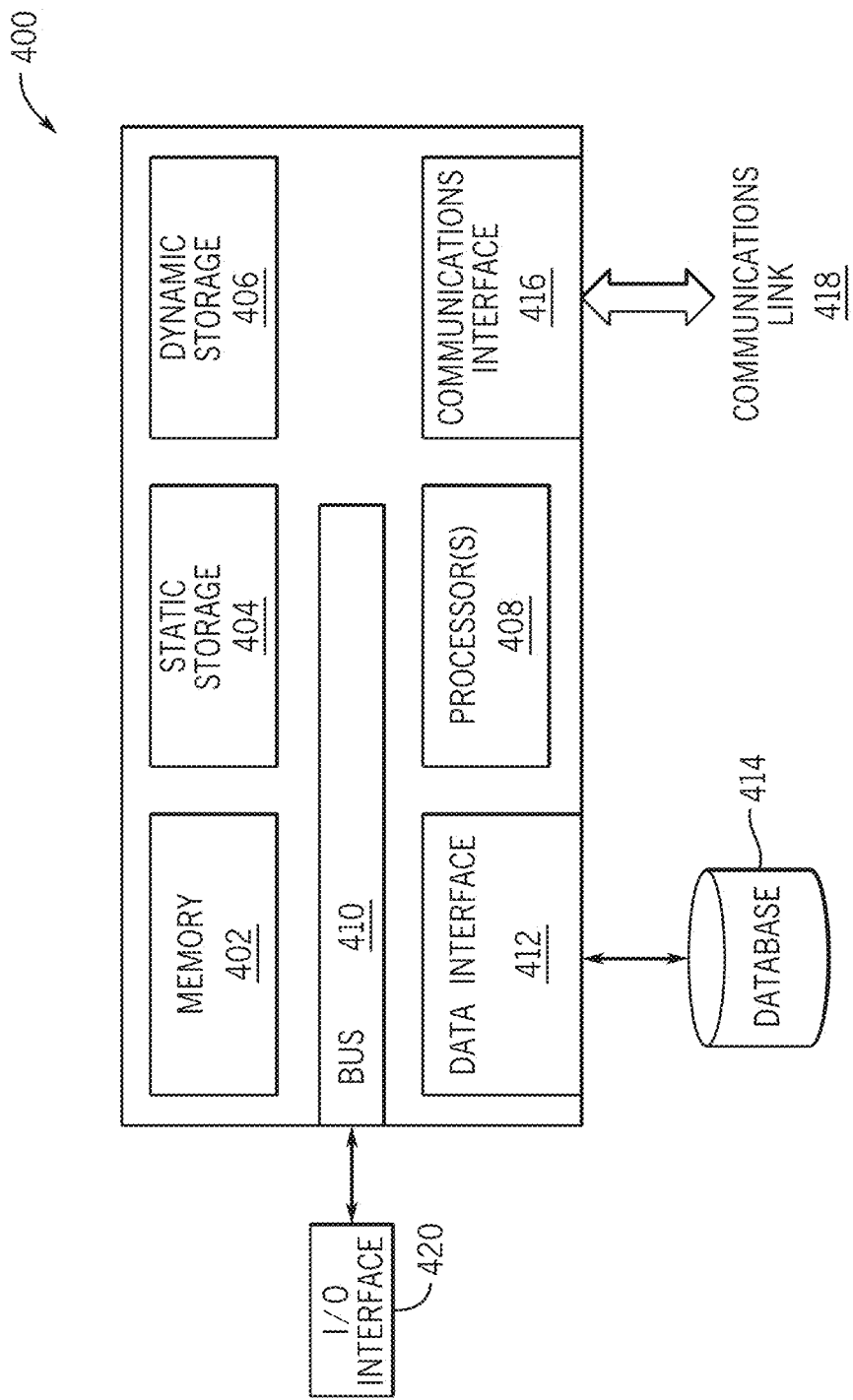
FIG. 4 illustrates an example computing system for implementing various examples of the present disclosure.

FIG. 4 illustrates an example computing system 400 for implementing various examples of the present disclosure. For example, in various embodiments, components of the AGV 100 or other systems described herein may be implemented by one or several computing systems 400. This disclosure contemplates any suitable number of computing systems 400. For example, the computing system 400 may be a server, a desktop computing system, a mainframe, a mesh of computing systems, a laptop or notebook computing system, a tablet computing system, an embedded computer system, a system-on-chip, a single-board computing system, or a combination of two or more of these. Where appropriate, the computing system 400 may include one or more computing systems; be unitary or distributed; span multiple locations; span multiple machines; span multiple data centers; or reside in a cloud, which may include one or more cloud components in one or more networks.

As shown, the computing system 400 includes memory 402 (e.g., RAM), static storage 404 (e.g., ROM), dynamic storage 406 (e.g., magnetic or optical), a processor 408, a data interface 412, a communications interface 416 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), an input/output (I/O) interface 420 (e.g., keyboard, keypad, mouse, microphone, display enabling communication between a user and the computing system 400), and a bus 410 (e.g., an address/data bus or other communication mechanism for communicating information and/or interconnecting subsystems and devices of the computing system 400), or any combination thereof. In embodiments, the computing system 400 may include one or more of any such components.

In embodiments, the processor 408 includes hardware for executing instructions, such as those making up a computer program. For example, the processor 408 may execute instructions for various components of the AGV 100 or other systems described herein. The processor 408 includes circuitry for performing various processing functions, such as executing specific software to perform the localization and navigation described herein, including the methods illustrated in FIGS. 5-8. In embodiments, the communications interface 416 provides one or more interfaces for communication between the computing system 400 and one or more AGVs (e.g., the AGV 100), one or more other computer systems, and/or one or more networks.

According to particular embodiments, the computing system 400 performs specific operations by processor 408 executing one or more sequences of one or more instructions contained in memory 402. For example, instructions for performing the localization and navigation methods described herein may be contained in memory 402 and may be executed by the processor 408. Such instructions may be read into memory 402 from another computer readable/usable medium, such as static storage 404 or dynamic storage 406. In alternative embodiments, hard-wired circuitry may be used in place of or in combination with software instructions. Thus, particular embodiments are not limited to any specific combination of hardware circuitry and/or software.

In various embodiments, the term "logic" means any combination of software or hardware that is used to implement all or part of particular embodiments disclosed herein. The term "computer readable medium" or "computer usable medium" may refer to any medium that participates in providing instructions to processor 408 for execution. Such a medium may take many forms, including but not limited to, nonvolatile media and volatile media. Non-volatile media includes, for example, optical or magnetic disks, such as static storage 404 or dynamic storage 406. Volatile media includes dynamic memory, such as memory 402.

Computing system 400 may transmit and receive messages, data, and instructions (e.g., program code) through communications link 418 and communications interface 416. For example, data may be received from sensor 220 and/or 320 over communications link 418. Received program code may be executed by processor 408 as it is received, and/or stored in static storage 404 or dynamic storage 406, or other storage for later execution. A database 414 may be used to store data accessible by the computing system 400 by way of data interface 412. In embodiments, the communications link 418 may communicate with the AGV 100 or other systems described herein (e.g., sensor 220 and/or 320).

Any of the features, components, and/or parts, including the arrangements and configurations thereof shown in FIG. 4 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 4.

Figure 5:
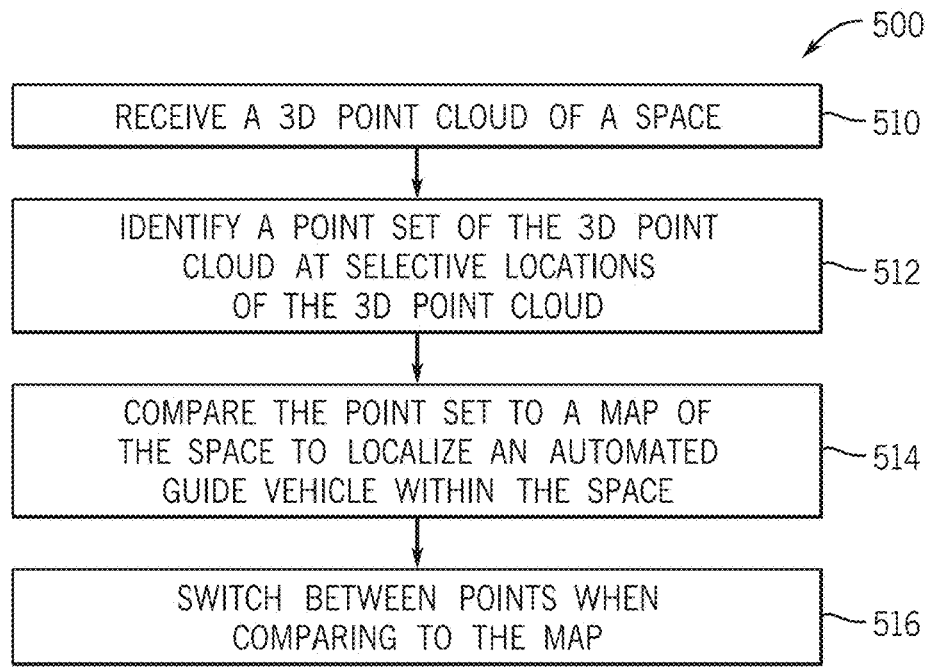
FIGS. 5-7 illustrate methods of localizing an AGV within a space.

FIG. 5 illustrates a first method 500 of localizing an AGV within a space. For explanatory purposes, the first method 500 is described herein with reference to FIGS. 1-4, although the first method 500 is not limited to the examples illustrated therein. For example, the first method 500 may be performed by the AGV 100 and/or computing system 400 (e.g., the processor 408), described above. Note that one or more operations in FIG. 5 may be combined, omitted, and/or performed in a different order, as desired.

At block 510, the first method 500 includes receiving a 3D point cloud of a space, such as in a manner as described herein. For example, the AGV 100 (e.g., the imaging system 118 or another sensor) may receive or capture 3D point cloud 210 or 310 in which the AGV 100 is operating (e.g., a ride environment).

At block 512, the first method 500 includes identifying a point set of the 3D point cloud at selective locations of the 3D point cloud, such as in a manner as described herein. For example, the selective locations may include multiple beam angles from a reference point. Block 512 may include identifying first, second, and third points of the 3D point cloud at the respective first, second, and third beam angles from a reference point (e.g., points 224A-224C at beam angles 226A-226C, respectively). Block 512 may include identifying a fourth point of the 3D point cloud at a fourth beam angle from the reference point (e.g., point 224D at beam angle 226D). Identifying the fourth point may be based on an occlusion to one of the first point, the second point, or the third point and/or to provide additional data for improved accuracy or confidence to localize the AGV.

In embodiments, the selective locations may include multiple 2D planes of the 3D point cloud. Block 512 may include identifying a first set of points at a first 2D plane of the 3D point cloud, and identifying a second set of points at a second 2D plane of the 3D point cloud (e.g., first and second 2D planes 318A, 318B).

At block 514, the first method 500 includes comparing the point set to a map of the space to localize an AGV within the space, such as in a manner as described herein. Block 514 may include comparing the fourth point and at least two of the first, second, and third points to the map to localize the AGV within the space. The map may be a map of known environmental features of the space. In embodiments, block 514 may include determining whether a desired accuracy or confidence in the localization is achieved, such as by looking at previous location data or considering additional points, within limitation.

At block 516, the first method 500 includes switching between points when comparing to the map, such as in a manner as described herein. Block 516 may include switching between the first set of points and the second set of points when comparing to the map. The switching may be based on an occlusion from a sensor to the one of the first 2D plane or the second 2D plane and/or to provide additional data for improved accuracy or confidence to localize the AGV. In embodiments, the switching may be based on additional ride vehicles (or other elements) moving into the space and/or a show element changing position.

Figure 6:
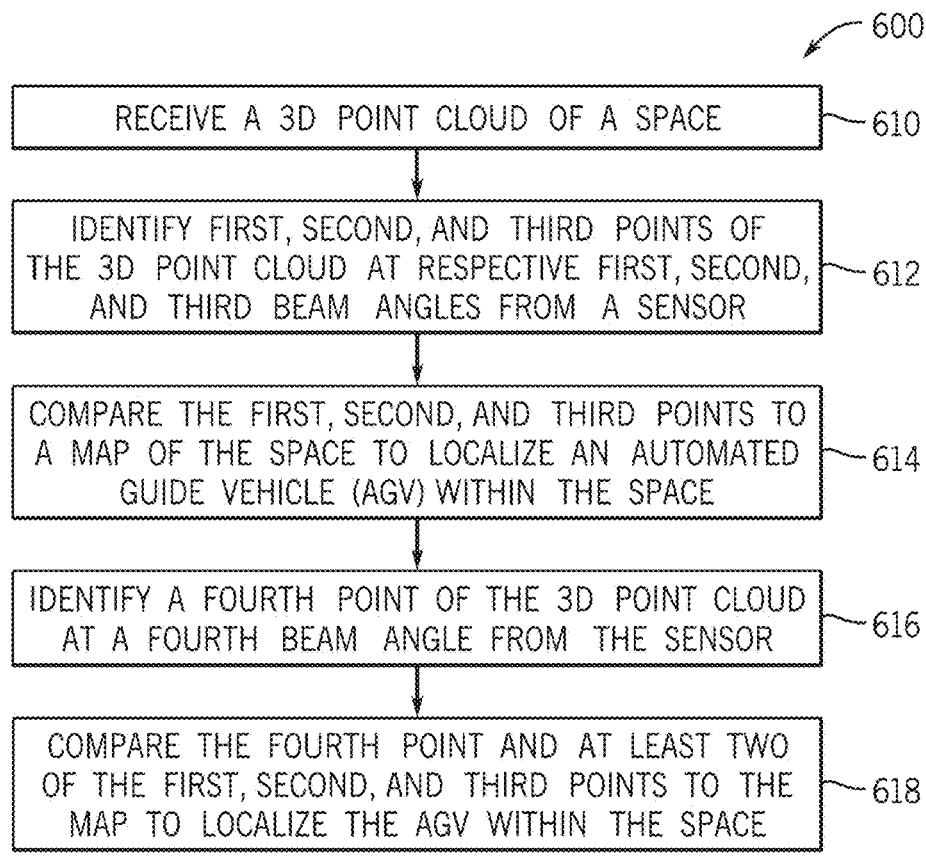

FIG. 6 illustrates a second method 600 of localizing an AGV within a space. For explanatory purposes, the second method 600 is described herein with reference to FIGS. 1-4, although the second method 600 is not limited to the examples illustrated therein. For example, the second method 600 may be performed by the AGV 100 and/or computing system 400 (e.g., the processor 408), described above. Note that one or more operations in FIG. 6 may be combined, omitted, and/or performed in a different order, as desired.

At block 610, the second method 600 includes receiving a 3D point cloud of a space, such as in a manner as described herein. For example, the AGV 100 (e.g., the imaging system 118 or another sensor) may receive or capture 3D point cloud 210 in which the AGV 100 is operating (e.g., a ride environment).

At block 612, the second method 600 includes identifying first, second, and third points of the 3D point cloud at respective first, second, and third beam angles from a sensor (e.g., points 224A-224C at beam angles 226A-226C, respectively). The first, second, and third beam angles are fixed angles in 3D space from the sensor. The first, second, and third points may be at multiple levels within the space. At block 614, the second method 600 includes comparing the first, second, and third points to a map of the space to localize an AGV within the space, such as in a manner as described herein.

At block 616, the second method 600 includes identifying a fourth point of the 3D point cloud at a fourth beam angle from the sensor (e.g., point 224D at beam angle 226D). Identifying the fourth point may be based on an occlusion to one of the first, second, or third point. At block 618, the second method 600 includes comparing the fourth point and at least two of the first, second, and third points to the map to localize the AGV within the space, such as in a manner as described herein.

Figure 7:
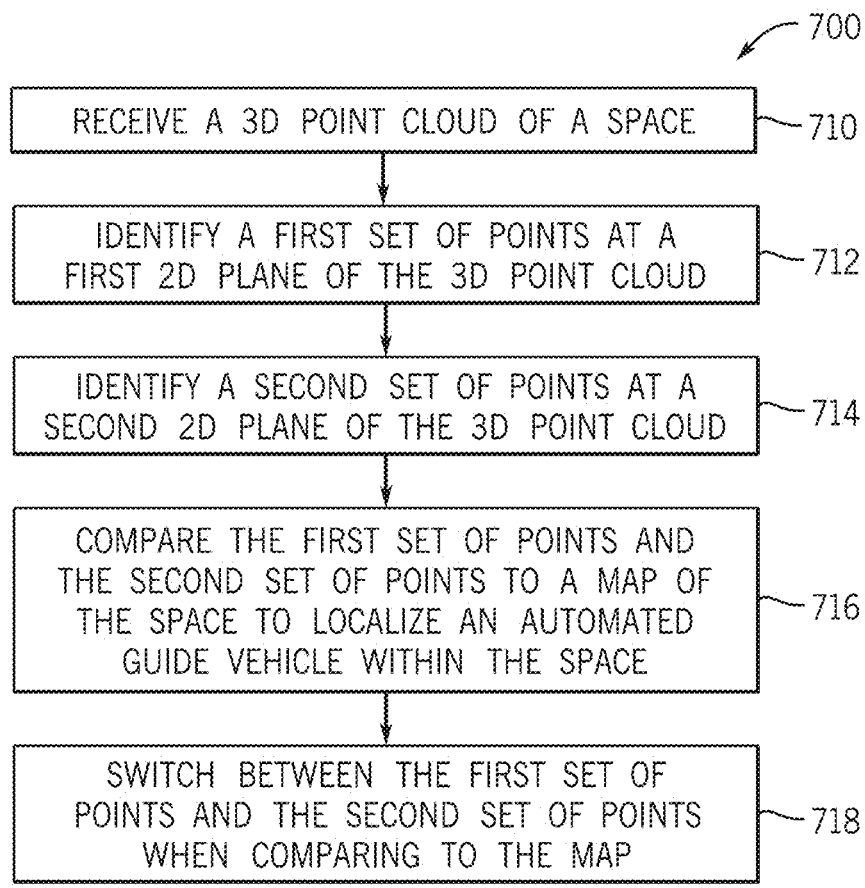

FIG. 7 illustrates a third method 700 of localizing an AGV within a space. For explanatory purposes, the third method 700 is described herein with reference to FIGS. 1-4, although the third method 700 is not limited to the examples illustrated therein. For example, the third method 700 may be performed by the AGV 100 and/or computing system 400 (e.g., the processor 408), described above. Note that one or more operations in FIG. 7 may be combined, omitted, and/or performed in a different order, as desired.

At block 710, the third method 700 includes receiving a 3D point cloud of a space, such as in a manner as described herein. For example, the AGV 100 (e.g., the imaging system 118 or another sensor) may receive or capture 3D point cloud 310 in which the AGV 100 is operating (e.g., a ride environment.

At block 712, the third method 700 includes identifying a first set of points at a first 2D plane of the 3D point cloud (e.g., the set of points at first 2D plane 318A). At block 714, the third method 700 includes identifying a second set of points at a second 2D plane of the 3D point cloud (e.g., the set of points at second 2D plane 318B). At least one of the first 2D plane or the second 2D plane may be adjacent a wall, floor, or ceiling of the space. At least one of the first 2D plane or the second 2D plane may be a horizontal plane. In other examples, at least one of the first 2D plane or the second 2D plane may be a vertical plane or canted from either horizontal or vertical.

At block 716, the third method 700 includes comparing the first set of points and the second set of points to a map of the space to localize an AGV within the space, such as in a manner as described herein. Localizing the AGV within the space may include identifying an anchoring element or feature in the map based on Cartesian locating or pole location.

At block 718, the third method 700 includes switching between the first set of points and the second set of points when comparing to the map, such as in a manner as described herein. The switching may be based on insufficient data at one of the first 2D plane or the second 2D plane. The switching may be based on an occlusion from a sensor to one of the first 2D plane or the second 2D plane.

Figure 8:
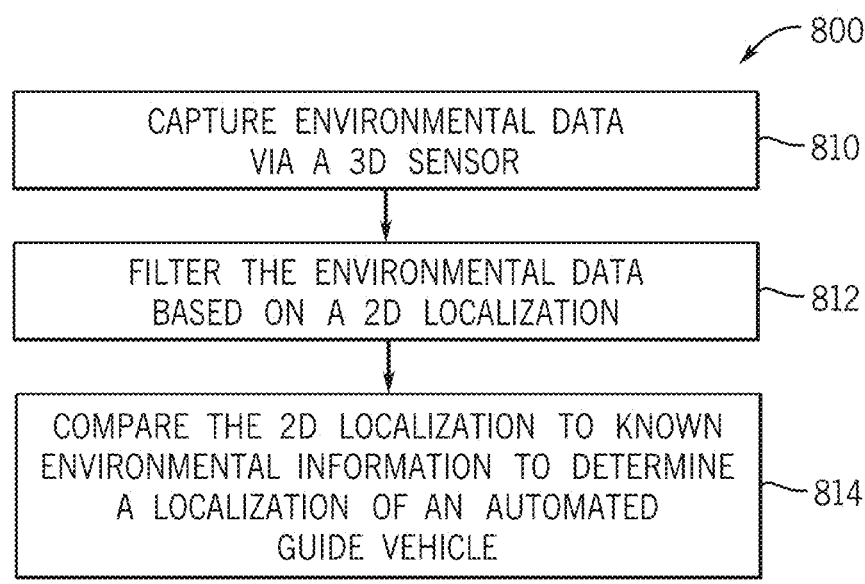
FIG. 8 illustrates a method for controlling an AGV within a ride environment.

FIG. 8 illustrates a method 800 for localizing an AGV within a ride environment. For explanatory purposes, the method 800 is described herein with reference to FIGS. 1-4, although the method 800 is not limited to the examples illustrated therein. For example, the method 800 may be performed by the AGV 100 and/or computing system 400 (e.g., the processor 408), described above. Note that one or more operations in FIG. 8 may be combined, omitted, and/or performed in a different order, as desired.

At block 810, the method 800 includes capturing environmental data via a 3D sensor, such as in a manner as described herein. Block 810 may include capturing a 3D point cloud of the ride environment (e.g., 3D point cloud 210 or 310).

At block 812, the method 800 includes filtering the environmental data based on a 2D localization, such as in a manner as described herein. Block 812 may include identifying a set of points at a 2D plane of the 3D point cloud (e.g., the set of points at first 3D plane 318A and/or second 2D plane 318B). Block 812 may include identifying first, second, and third points of the 3D point cloud at respective first, second, and third beam angles from the 3D sensor (e.g., points 224A-224C at beam angles 226A-226C, respectively).

At block 814, the method 800 includes comparing the 2D localization to known environmental information to determine a localization of an AGV, such as in a manner as described herein. The known environmental information may include a map of the ride environment. The known environmental information may also include attraction information or timing, other moving objects (e.g., show sets or other ride vehicles), etc. Such information may also be used to dictate a control operation or output for the AGV (e.g., to direct navigation of the AGV through the attraction).

The embodiments illustrated in FIGS. 1-8 are non-limiting examples for providing an AGV and/or other system configured to localize and navigate an AGV in space using selective points, planes, or levels of a 3D point cloud. Thus, the description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A method comprising:
   receiving a three-dimensional (3D) point cloud of a space;
   identifying a point set of the 3D point cloud at selective locations of the 3D point cloud, wherein the selective locations comprise multiple two-dimensional (2D) planes of the 3D point cloud, and wherein the identifying comprises:
     filtering a first set of points from the 3D point cloud, the first set of points defining a first 2D plane of the 3D point cloud; and
     filtering a second set of points from the 3D point cloud, the second set of points defining a second 2D plane of the 3D point cloud;
   comparing the point set to a map of the space to determine a localization of an automated guide vehicle (AGV) within the space, wherein the map is a map of known environmental features of the space; and
   controlling the AGV to move to a position within the space based on the localization.

2. A method comprising:
   receiving a three-dimensional (3D) point cloud of a space;
   identifying first, second, third, and fourth points of the 3D point cloud at respective first, second, third, and fourth beam angles from a sensor;
   localizing an automated guide vehicle (AGV) within the space by comparing the fourth point and at least two of the first, second, and third points to a map of the space; and
   controlling the AGV to move to a position within the space based on the localizing.

3. The method of claim 1, further comprising switching between the first set of points and the second set of points when comparing to the map.

4. The method of claim 2, wherein the map is a 3D map of the space.

5. A system configured to perform the method of claim 2, wherein the system comprises one or more sensors configured to perform a 3D scan of the space to generate the 3D point cloud.

6. An automated guide vehicle (AGV) comprising a processor configured to perform the method of claim 2, wherein the AGV is a ride vehicle operating in a thematic environment.

7. The method of claim 2, wherein:
the map is a map of known environmental features of the space.

8. The method of claim 2, wherein the identifying the fourth point is based on an occlusion to one of the first, second, or third point.

9. The method of claim 2, wherein the first, second, and third beam angles are fixed angles in 3D space from the sensor.

10. The method of claim 9, wherein the first, second, and third beam angles are selected to identify an anchoring element within the space.

11. The method of claim 2, wherein the first, second, and third points are at multiple levels within the space.

12. A method comprising:
receiving a three-dimensional (3D) point cloud of a space;
filtering a first set of points from the 3D point cloud, the first set of points defining a first two-dimensional (2D) plane of the 3D point cloud;
filtering a second set of points from the 3D point cloud, the second set of points defining a second 2D plane of the 3D point cloud; and
localizing an automated guide vehicle (AGV) within the space by comparing the first set of points and the second set of points to a map of the space; and
controlling the AGV to move to a position within the space based on the localizing.

13. The method of claim 12, further comprising switching between the first set of points and the second set of points when comparing to the map.

14. The method of claim 13, wherein the switching is based on insufficient data at one of the first 2D plane or the second 2D plane.

15. The method of claim 13, wherein the switching is based on an occlusion from a sensor to one of the first 2D plane or the second 2D plane.

16. The method of claim 12, wherein at least one of the first 2D plane or the second 2D plane is adjacent a wall, floor, or ceiling of the space.

17. The method of claim 12, wherein at least one of the first 2D plane or the second 2D plane is a horizontal plane.

18. The method of claim 12, wherein localizing the AGV within the space comprises identifying an anchoring element or feature in the map based on Cartesian locating or pole location.

19. A method for localizing an automated guide vehicle (AGV) within a ride environment, the method comprising:
capturing environmental data via a three-dimensional (3D) sensor, wherein the environmental data comprises a 3D point cloud;
filtering the environmental data based on a two-dimensional (2D) localization, wherein the filtering comprises:
filtering a first set of points from the 3D point cloud, the first set of points defining a first 2D plane of the 3D point cloud; and
filtering a second set of points from the 3D point cloud, the second set of points defining a second 2D plane of the 3D point cloud;
comparing the 2D localization to known environmental information to determine a localization of the AGV; and
controlling the AGV to move to a position within the space based on the localization.

20. The method of claim 19, wherein the 3D point cloud is of the ride environment.

21. The method of claim 19, wherein the filtering comprises identifying first, second, and third points of the 3D point cloud at respective first, second, and third beam angles from the 3D sensor.

22. The method of claim 19, wherein the known environmental information comprises a map of the ride environment.

23. The method of claim 12, wherein the first 2D plane is at a first vertical level of the 3D point cloud, and wherein the second 2D plane is at a second vertical level of the 3D point cloud.

24. An automated guide vehicle (AGV) comprising a processor configured to perform the method of claim 1.

25. The AGV of claim 24, wherein the AGV is a ride vehicle.

* * * * *